(12) United States Patent
Covington et al.

(10) Patent No.: US 11,343,964 B1
(45) Date of Patent: May 31, 2022

(54) SUSPENSION SYSTEM FOR LAWNMOWER

(71) Applicant: Bad Boy, Inc., Batesville, AR (US)

(72) Inventors: Charles Bradley Covington, Batesville, AR (US); Warren Russell Long, Batesville, AR (US)

(73) Assignee: Bad Boy, Inc., Batesville, AR (US)

( * ) Notice: Subject to any disclaimer, the term of this patent is extended or adjusted under 35 U.S.C. 154(b) by 88 days.

(21) Appl. No.: 16/824,946

(22) Filed: Mar. 20, 2020

Related U.S. Application Data

(63) Continuation of application No. 16/299,670, filed on Mar. 12, 2019, now Pat. No. 10,709,065, which is a continuation of application No. 16/193,316, filed on Nov. 16, 2018, now Pat. No. 10,356,978, which is a continuation of application No. 15/673,744, filed on Aug. 10, 2017, now Pat. No. 10,188,033, which is a continuation-in-part of application No. 14/735,640, filed on Jun. 10, 2015, now Pat. No. 9,730,386.

(60) Provisional application No. 62/010,634, filed on Jun. 11, 2014.

(51) Int. Cl.
*A01D 34/00* (2006.01)
*A01D 34/82* (2006.01)
*A01D 34/64* (2006.01)
*B60G 3/08* (2006.01)
*B62D 11/06* (2006.01)
*A01D 101/00* (2006.01)

(52) U.S. Cl.
CPC .............. *A01D 34/82* (2013.01); *A01D 34/64* (2013.01); *B60G 3/08* (2013.01); *B62D 11/06* (2013.01); *A01D 2101/00* (2013.01); *B60G 2200/142* (2013.01); *B60G 2202/21* (2013.01); *B60G 2300/084* (2013.01)

(58) Field of Classification Search
CPC ........ A01D 34/42; A01D 34/64; A01D 34/82; A01D 69/10; B62D 7/10; B62D 11/06
See application file for complete search history.

(56) References Cited

U.S. PATENT DOCUMENTS

| | | | |
|---|---|---|---|
| 2,442,831 | A | 6/1948 | Suttles |
| 2,689,136 | A | 9/1954 | Hendrickson |
| 2,915,776 | A | 12/1959 | Hanson et al. |
| 3,025,079 | A | 3/1962 | Gouirand |
| 3,669,467 | A | 3/1972 | Dunlap et al. |
| 3,737,174 | A | 6/1973 | Hickman |

(Continued)

OTHER PUBLICATIONS

"Hydro-Gear EZT (ZT-2200) Transmission" available at <https://www.youtube com/watch?v=sdR7kGvRU10>, Feb. 5, 2013.

(Continued)

*Primary Examiner* — Hau V Phan
(74) *Attorney, Agent, or Firm* — Bracewell LLP; Christopher L. Drymalla

(57) ABSTRACT

In a riding mower having a frame, a mower deck supported beneath the frame, a chair on said frame and a source of motive power also supported on said frame and including two hydraulic transaxles depending beneath the frame to each selectively rotate a drive wheel. The frame is supported on forward and rear wheel assemblies with a supporting wheel. The transaxles are supported beneath the frame and pivotally secured thereto by a flange captivating vibration pillows and proximate the driven wheel and an inner pivot rod secured to the frame by apertures in downwardly depending tabs.

30 Claims, 5 Drawing Sheets

(56) References Cited

U.S. PATENT DOCUMENTS

| | | | |
|---|---|---|---|
| 4,310,171 A | 1/1982 | Merkle | |
| 4,310,717 A | 1/1982 | Eastman et al. | |
| 4,485,521 A | 12/1984 | Welsch et al. | |
| 4,559,669 A | 12/1985 | Bonzer et al. | |
| 4,903,545 A | 2/1990 | Louis et al. | |
| 5,156,576 A | 10/1992 | Johnson | |
| 5,400,469 A | 3/1995 | Simonsen | |
| 5,542,494 A | 8/1996 | Louis et al. | |
| 5,899,470 A | 5/1999 | Heitzmann | |
| 5,979,920 A | 11/1999 | Krakowiak et al. | |
| 6,026,920 A | 2/2000 | Obeda et al. | |
| 6,170,242 B1 | 1/2001 | Gordon | |
| 6,460,318 B1 | 10/2002 | Ferris et al. | |
| 6,644,425 B1 | 11/2003 | Hauser | |
| 6,732,828 B1 | 5/2004 | Abend et al. | |
| 6,845,837 B2 | 1/2005 | Ohashi et al. | |
| 6,848,937 B1 | 2/2005 | Hsiao | |
| 6,857,254 B2 | 2/2005 | Melone et al. | |
| 6,889,793 B2 | 5/2005 | Okada et al. | |
| 7,127,889 B1 | 10/2006 | Bennett et al. | |
| 7,363,759 B2 | 4/2008 | Ohashi et al. | |
| 7,455,114 B2 | 11/2008 | Macdougall | |
| 7,588,104 B2 | 9/2009 | Ohashi et al. | |
| 7,621,353 B2 * | 11/2009 | Ishii | B60K 17/28 180/305 |
| 7,708,292 B2 | 5/2010 | Foster | |
| 8,141,886 B1 * | 3/2012 | Sugden | A01D 34/82 280/32.5 |
| 8,262,104 B2 | 9/2012 | Kallevig et al. | |
| 8,387,205 B2 * | 3/2013 | Weihl | A01D 42/06 15/347 |
| 8,393,236 B1 * | 3/2013 | Hauser | F16D 55/24 74/15.4 |
| 8,470,229 B2 * | 6/2013 | Nasvik | E01C 19/44 264/293 |
| 8,517,159 B1 * | 8/2013 | Langenfeld | A01D 69/10 192/224.2 |
| 8,561,382 B2 * | 10/2013 | Gamble | A01D 34/64 56/14.7 |
| 8,662,212 B2 * | 3/2014 | Lawson, Jr. | B62D 11/24 180/6.48 |
| 8,733,478 B2 | 5/2014 | Chapman | |
| 8,997,914 B2 | 4/2015 | Umemoto et al. | |
| 9,161,490 B2 | 10/2015 | Melone et al. | |
| 9,723,781 B1 | 8/2017 | Covington | |
| 9,730,386 B1 | 8/2017 | Covington et al. | |
| 9,821,689 B2 | 11/2017 | Busboom et al. | |
| 9,914,356 B2 | 3/2018 | Simon | |
| D830,419 S | 10/2018 | Covington et al. | |
| D830,420 S | 10/2018 | Covington et al. | |
| 10,188,033 B1 | 1/2019 | Covington et al. | |
| 10,349,577 B1 | 7/2019 | Covington et al. | |
| 10,356,978 B1 | 7/2019 | Covington et al. | |
| 10,485,168 B1 | 11/2019 | Covington et al. | |
| 10,569,609 B1 | 2/2020 | Covington et al. | |
| 10,709,065 B1 | 7/2020 | Covington et al. | |
| 10,721,864 B1 | 7/2020 | Covington et al. | |
| 10,953,715 B1 | 3/2021 | Long et al. | |
| 11,142,031 B1 | 10/2021 | Covington et al. | |
| 2005/0144923 A1 | 7/2005 | Melone et al. | |
| 2007/0029118 A1 | 2/2007 | Acharya et al. | |
| 2007/0284839 A1 | 12/2007 | Sasaoka | |
| 2008/0018269 A1 * | 1/2008 | Wyatt | B62D 5/0418 318/53 |
| 2009/0033054 A1 | 2/2009 | Foster | |
| 2009/0302562 A1 | 12/2009 | Kallevig et al. | |
| 2011/0193309 A1 | 8/2011 | Nance | |
| 2011/0197419 A1 | 8/2011 | Melone et al. | |
| 2012/0000173 A1 * | 1/2012 | Papke | A01D 34/82 56/14.7 |
| 2013/0074466 A1 | 3/2013 | Zwieg et al. | |
| 2013/0264788 A1 * | 10/2013 | Smyth | B62D 7/10 280/98 |
| 2013/0291508 A1 | 11/2013 | Melone et al. | |
| 2016/0152262 A1 | 6/2016 | Laurin et al. | |
| 2016/0347137 A1 | 12/2016 | Despres-Nadeau et al. | |
| 2017/0028844 A1 | 2/2017 | Melone et al. | |
| 2018/0229570 A1 | 8/2018 | Fay, II et al. | |
| 2018/0249630 A1 | 9/2018 | Mullet et al. | |
| 2019/0193501 A1 | 6/2019 | Brady et al. | |
| 2020/0352098 A1 | 11/2020 | Fujii et al. | |

OTHER PUBLICATIONS

"Hydro-Gear ZT-3400 Product Presentation (english)" available at <https://www.youtube.com/watch?v=stZh8uQRh1A>, Feb. 6, 2012.

Bad Boy Mowers "AOS Diesel Model Mower Owner's & Parts Manual" 2010 Edition; pp. 1-40.

Bad Boy Mowers "AOS Model Mower Owner's & Parts Manual" 2010 Edition; pp. 1-40.

Bad Boy Mowers "Bad Boy AOS Part Manual: 35hp Vanguard; 27hp Kawasaki" 2007; pp. 1-31.

Bad Boy Mowers "Bad Boy Diesel Part Manual: 35hp Caterpillar Diesel; 28hp Caterpillar Diesel" 2007; pp. 1-30.

Bad Boy Mowers "Bad Boy Parts Manual for Pup and Lightning Models: 23hp Vanguard; 26hp Kawasaki; 30hp Kohler; 32hp Vanguard" 2007; pp. 1-30.

Bad Boy Mowers "Compact Diesel Model Mower Owner's & Parts Manual" 2010 Edition; pp. 1-36.

Bad Boy Mowers "Diesel AOS & Compact Zero-Turn Mower Owner's, Service & Parts Manual" 2011; pp. 1-56.

Bad Boy Mowers "Diesel Compact Diesel Models Zero-Turn Mower Owner's, Service & Parts Manual" 2012; pp. 1-52; see pp. 33 and 35.

Bad Boy Mowers "Lightning & Pup Zero-Turn Mower Owner's, Service & Parts Manual" 2011; pp. 1-56.

Bad Boy Mowers "Outlaw Stand-On Model Zero-Turn Mower Owner's, Service & Parts Manual"; 2017; pp. 1-58.

Bad Boy Mowers "Outlaw XP Models Zero-Turn Mower Owner's, Service & Parts Manual" 2012; pp. 1-44; see pp. 29-30.

Bad Boy Mowers "Parts Manual for Bad Boy AOS Models: 35hp Vanguard; 27hp Kawasaki" 2008; pp. 1-29.

Bad Boy Mowers "Parts Manual for Bad Boy AOS Models: 35hp Vanguard; 27hp Kawasaki" 2009; pp. 1-28.

Bad Boy Mowers "Parts Manual for Bad Boy Diesel Models: 35hp Caterpillar; 28hp Caterpillar" 2008; pp. 1-28.

Bad Boy Mowers "Parts Manual for Bad Boy Diesel Models: 35hp Caterpillar; 28hp Caterpillar" 2009; pp. 1-27.

Bad Boy Mowers "Parts Manual for Bad Boy Pup and Lightning Models: 23hp Vanguard; 30hp Kohler; 26hp Kawasaki; 32hp Vanguard; 31hp Kawasaki" 2008; pp. 1-36.

Bad Boy Mowers "Parts Manual for Bad Boy Pup and Lightning Models: 23hp Vanguard; 30hp Kohler; 26hp Kawasaki; 32hp Vanguard; 31hp Kawasaki" 2009; pp. 1-33.

Bad Boy Mowers "Pup or Lightning Model Mower Owner's & Parts Manual" 2010 Edition; pp. 1-48.

Bad Boy Mowers "Revolt Stand on Zero-Turn Mower Owner's, Service & Parts Manual"; 2019; pp. 1-52.

Bad Boy Mowers "Rogue Outlaw Zero-Turn Mower Owner's, Service & Parts Manual" 2019; pp. 1-60.

Exmark Manufacturing Company, Inc.; "Staris E-Series" brochure; 2019; pp. 1-2.

Exmark Master Parts Viewer; "Model: STE600GKA44300 Year: 2019 Serial Range: 404314159-406294344" available as of Jun. 6, 2019 at: https://lookup3.toro.com/partdex/exmark/index.cfm?xCaller=exmark%26adv=y; p. 1.

Hydro-Gear; "ZI-2800/ZT-3100/ZT-3400 Integrated Zero-Turn Transaxle Service and Repair Manual" BLN-52441, Jan. 2013; pp. 1-52.

Parker; "Integrated Hydrostatic Transmissions HTE, HTJ and HTG Series" Oct. 2015; pp. 1-6.

* cited by examiner

Pivot Points

SUSPENSION SYSTEM FOR LAWNMOWER

CROSS-REFERENCE TO RELATED APPLICATIONS

This application is a continuation of U.S. patent application Ser. No. 16/299,670, filed on Mar. 12, 2019 and titled "SUSPENSION SYSTEM FOR LAWNMOWER", which is a continuation of U.S. patent application Ser. No. 16/193,316 (now U.S. Pat. No. 10,356,978), filed on Nov. 16, 2018 and titled "SUSPENSION SYSTEM FOR LAWNMOWER", which is a continuation of U.S. patent application Ser. No. 15/673,744 (now U.S. Pat. No. 10,188,033), filed on Aug. 10, 2017 and titled "SUSPENSION SYSTEM FOR LAWNMOWER", which is a continuation-in-part of U.S. patent application Ser. No. 14/735,640 (now U.S. Pat. No. 9,730,386), filed on Jun. 10, 2015 and titled "SUSPENSION SYSTEM FOR LAWNMOWER", which claims priority to U.S. Provisional Patent Application No. 62/010,634, filed on Jun. 11, 2014 and titled "SUSPENSION SYSTEM FOR LAWNMOWER", each of which are hereby incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to riding mowers and, more particularly, to an improved suspension system for motive systems on such mowers or the like. Known art can be found in U.S. Class 280, subclass 124 and in other classes and subclasses.

2. Description of the Known Art

Those skilled in the art will appreciate that riding mowers have been a staple for maintaining residential yards, commercial lawns, golf courses and highway rights of way for many years. They are seen moving along grass in many settings including grassy center dividers and along the sides of roads in rough, sometimes rocky terrain, and in all sorts of attitudes from flat and level to severe side hills.

In many instances, an operator may be in the seat for hours, and even with a kidney belt, will suffer considerable discomfort and, in some cases, injury. Indeed, it is not inconceivable that the constant bouncing and jarring could cause an operator to lose control, resulting in damage to the operator and others.

The underlying purpose and function of the present invention is to provide an element of relief to an operator and increased vehicle control. The invention disclosed in U.S. Pat. No. 7,708,292 issued to Foster deals with these issues. While this invention works well for its intended purpose, an improved system that places a hydrostatic axle proximate a drive wheel improves vehicle stability while also promoting operator comfort.

Most of the other known riding mowers in use today have their wheels affixed directly to the frame of the mower. In the late '90s the self proclaimed leader in the field, David Ferris, and others filed an application for a suspension system for riding mowers. The application claims priority based on provisionals, at least one of which dates back to 1996, and was divided and one of those continuations-in-part issued as Ferris et al. U.S. Pat. No. 6,460,318. The patent features a four bar mechanism relatively common in automotive suspensions.

Known art which may be relevant to the present invention includes the following patents with their abstracts, the teachings of which are incorporated by reference.

Gordon U.S. Pat. No. 6,170,242 is yet another patent assigned to Ferris Industries and claims priority under a 1997 provisional, which is also claimed under the earlier mentioned Ferris et al. patent. Gordon, like Ferris et al., features a four bar mechanism.

A very early patent featuring a rubber bumper between two elements in an automotive structure is found in Hickman U.S. Pat. No. 3,737,174.

Several other patents offer variations on the same theme. See, for example, Dunlap et al. U.S. Pat. No. 3,669,467, which has additional buffering devices, such as springs, leaf or coil, and shock absorbing devices. Dunlap has a pair of cushions, but also uses a pair of rods 32 and 34, which attach directly to the frame rail.

Krakowiak et al. U.S. Pat. No. 5,979,920, uses the simple bumper between the frame rail and a leaf spring. This is a device which is common on many of the earlier motor vehicles.

Merkle U.S. Pat. No. 4,310,717, uses what he refers to as an elastomeric spring, again, between the frame rail and what he refers to as a web section which holds the axle upon which the wheel is connected. It appears in the drawing that there may be a shock absorber in the middle of this assembly.

Bonzer et al. U.S. Pat. No. 4,559,669, employs a resilient buffer 19 for a caster assembly. Heitzman U.S. Pat. No. 5,899,470 uses a couple of resilient buffers as part of a system for adjusting camber and caster. It is evident from these patents that using an elastomeric as a spring or shock absorber is not new in the art. All of these references seek, to a greater or lesser extent, some modulation of the amplitude and frequency of shock transmitted through a wheel of a vehicle, but are unsuited for a riding mower.

Also, commercially available equipment and components may be relevant, including hollow metal frames, shoe brushes and the like. Such equipment may be used in implementing an exemplary embodiment in accordance with the present invention.

None of these references, either singly or in combination, disclose or suggest the present invention. It is desirable to have a improved lawnmower to address the perceived shortcomings of the known art.

While it is evident from past attempts that suspension systems for lawnmowers are desirable, the known art is limited in its teaching and utilization, and an improved system is needed to overcome these limitations. An improved suspension system should provide a simple and efficient system for meeting the various needs of the users and the like.

SUMMARY OF THE INVENTION

The present invention addresses the perceived needs in the known art discussed above. In this regard, the present invention substantially fulfills this need. The suspension system for lawnmower may be advantageously used with zero-turn lawnmowers or others using transaxles combined with hydraulic pumps for motive power and the like. The transaxles are dampened by at least one pillow interposed between the frame the wheel with each pillow being of a resilient material for absorbing shock and vibration resulting from a wheel contacting irregularities in the terrain traversed thereby.

In one exemplary embodiment in accordance with the present invention an improved suspension system may be used with the rear axles to provide a motive source proximate the driven rear wheels and substantially isolated from the frame of the lawnmower to thereby dampen vibrations transmitted to the operator as the vehicle traverses the ground.

The apparatus of the invention is capable of receiving additional, optional features which are not a part of the present invention. For example, a purchaser or user may specify an optional mulcher or bagger or the like for a lawnmower. Other optional features, some of which may be illustrated herein, may or may not be included with apparatus incorporating the basic aspects of present invention.

In addition to providing the features and advantages referred to above, it is an object of the present invention to provide an improved suspension system for lawnmower.

Another object of the present invention is to provide a lawnmower with a lowered center of gravity.

A basic object of the present invention is to provide a more stable lawnmower.

Yet another object of the present invention is to enhance user comfort.

A related object of the present invention is to provide a safer lawnmower.

These and other objects and advantages of the present invention, along with features of novelty appurtenant thereto, will appear or become apparent by reviewing the following detailed description of the invention in conjunction with the appended drawings.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
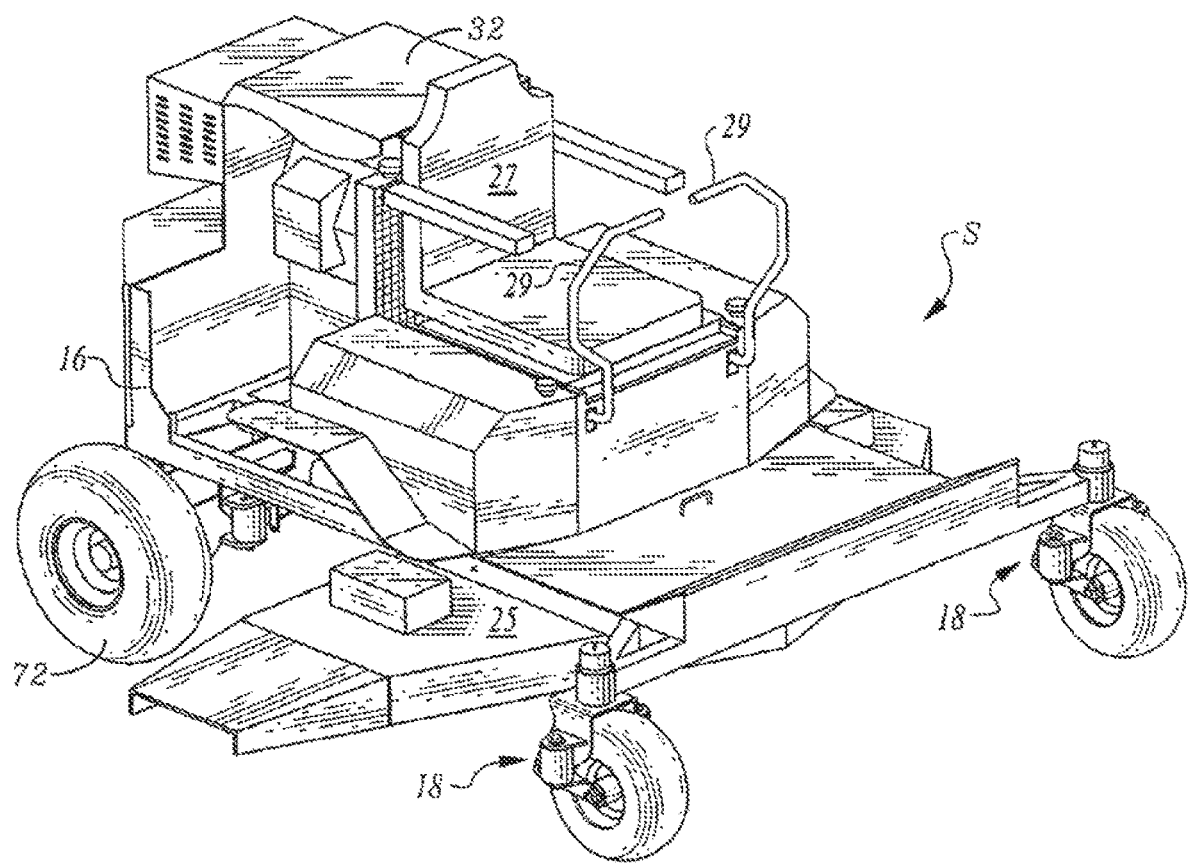
FIG. 1 is a perspective view of a riding mower in accordance with an embodiment of the present invention.
Figure 2:
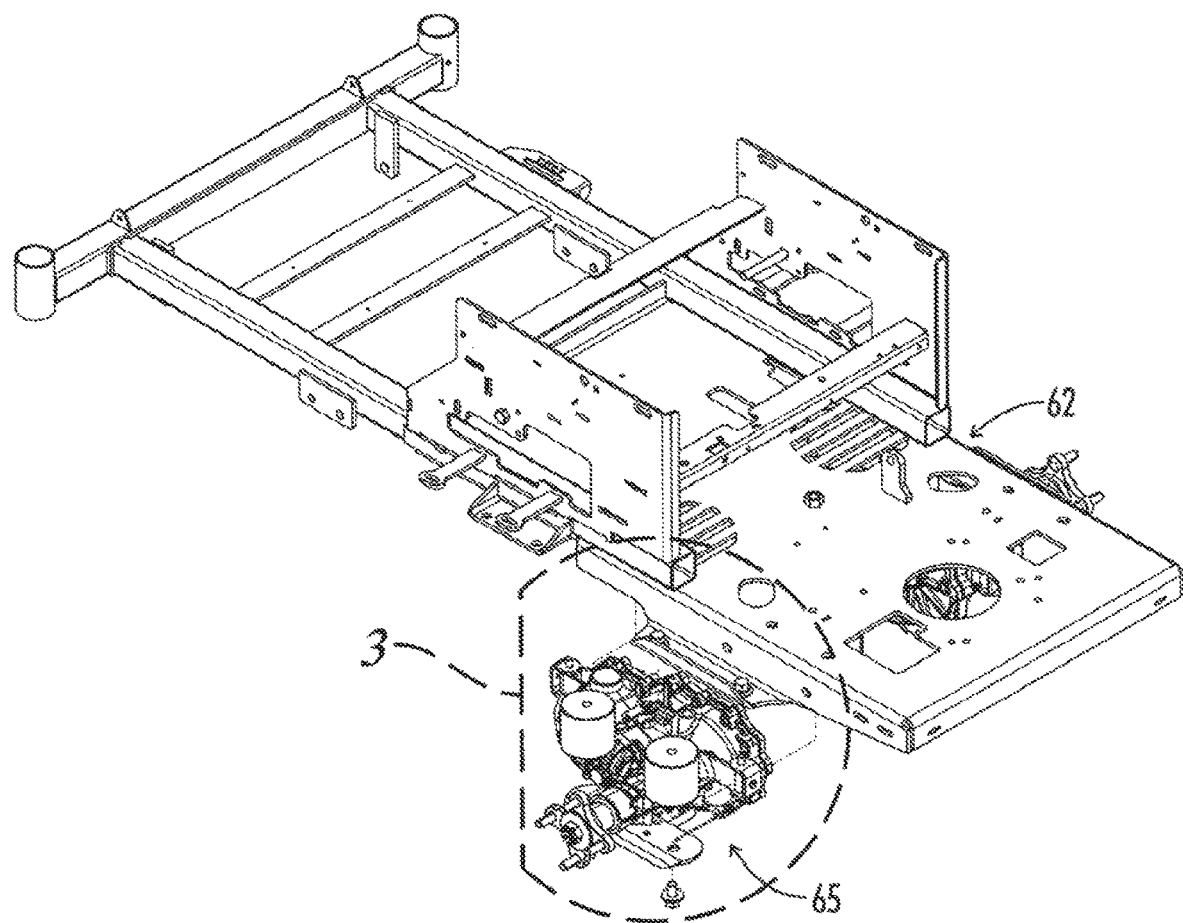
FIG. 2 is a perspective view of the frame of the mower with the rear axle assembly shown.
Figure 3:
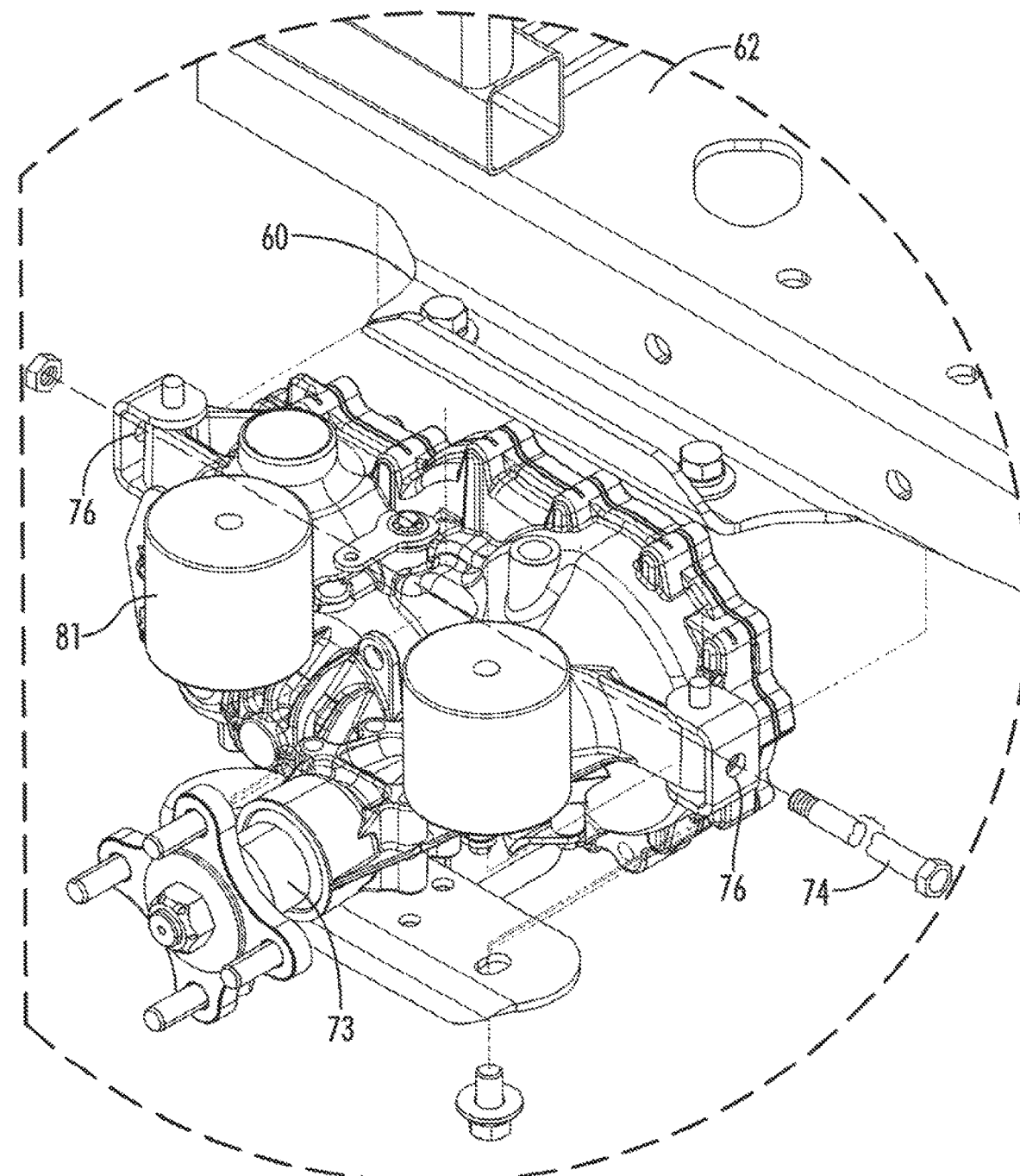
FIG. 3 is an enlarged perspective view of the encircled portion of FIG. 2.
Figure 4:
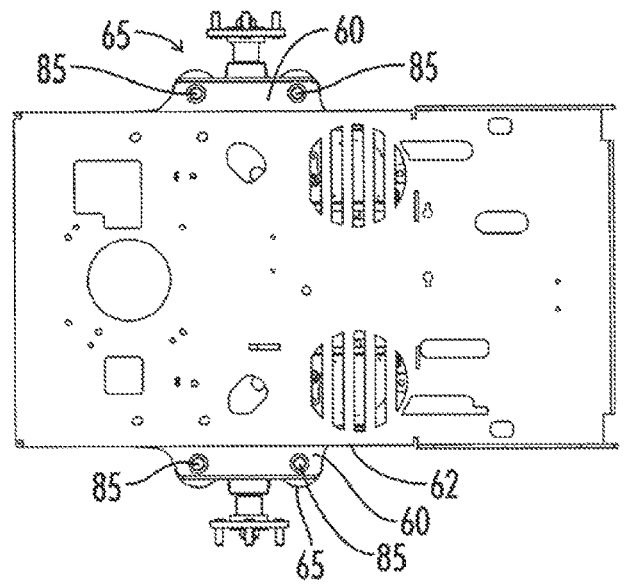
FIG. 4 is a top plan view of the frame.
Figure 7:
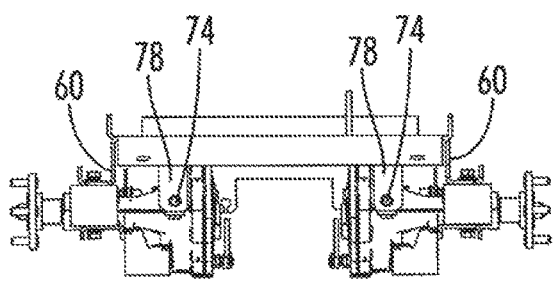
FIG. 7 is an elevational view taken generally from the rear thereof.
Figure 6:
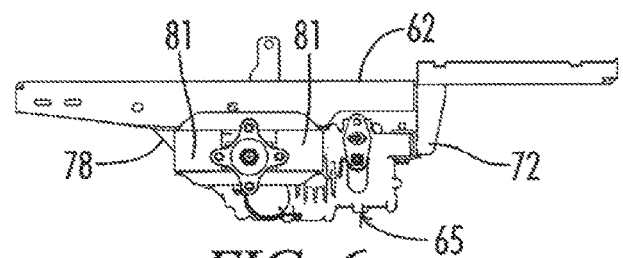
FIG. 6 is an elevational view taken from the side with the opposite side being a mirror image thereof.
Figure 5:
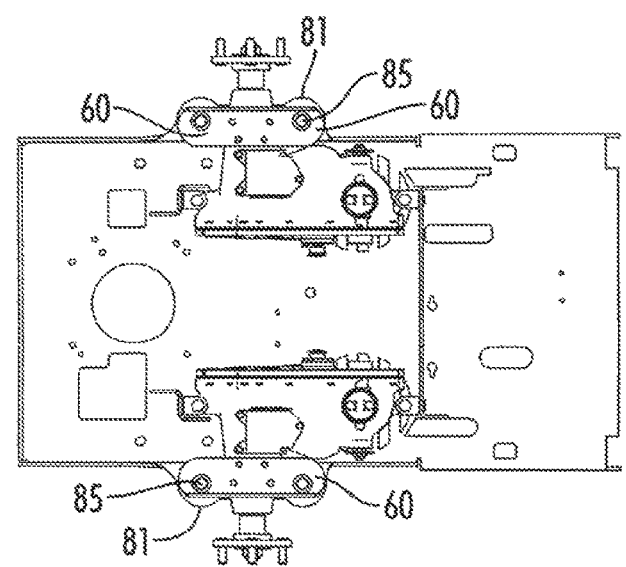
FIG. 5 is a bottom plan view thereof.

The present invention addresses the perceived needs in the known art discussed above. In this regard, the present invention substantially fulfills this need. The improved suspension system for lawnmower includes a vibration damping system with transaxles that are attached to the rear axle assemblies that also provide motive power thereto.

In one exemplary embodiment in accordance with the present invention and shown in FIGS. 1-9, an improved riding mower 11 is illustrated. The mower 11 has a frame 16 supported by a pair of forward wheel assemblies 18 and rear wheel assemblies 72.

The frame 16 supports a mower deck 25, and a chair 27 is provided for a driver, with a pair of steering arms 29 within easy reach. A motor compartment 32 rides on the frame and provides motive power to the mower through right and left integrated hydrostatic transaxles 65 that drive right and left rear wheels 72 in response to operator manipulation of control handles 29.

One important feature of the present invention is the provision of the mower 11 which has enhanced comfort and less fatigue for the driver, all of which increases the ability of the driver to control the mower, even in unusual attitudes resulting from irregularities in the terrain, and over extended periods of operation, and particularly where terrain changes are abrupt. In accomplishing its objectives, both forward and rear systems of vibration control are interposed between each of the supporting wheel assemblies and the frame of the mower.

It is a feature of the present invention that a rear suspension system is provided with vibration damping capability. Referring to FIGS. 2-9, the rear segment 62 of the frame 16 supports two spaced apart rear axle transaxles 65, which are mounted transverse to the longitudinal axis of the mower 11.

The frame supports downward flanges 66 that captivate a portion of each transaxle 65 on the sides of the mower 11. Each of the transaxles 65 supports an outer driven wheel assembly 72 through an axle 73 and, in keeping with the objectives of the invention, are articulated about a pivot pin 74 (which may be a bolt and nut or other similar device) in a plane transverse to the plane of the transaxle housing. The pivot pin 74 is secured in apertures 76 in tabs 78 depending from the frame 62. Companion apertures 78 align with the apertures 76 to receive the pivot pins 74 which then permit pivotal movement thereabout.

Figure 8:
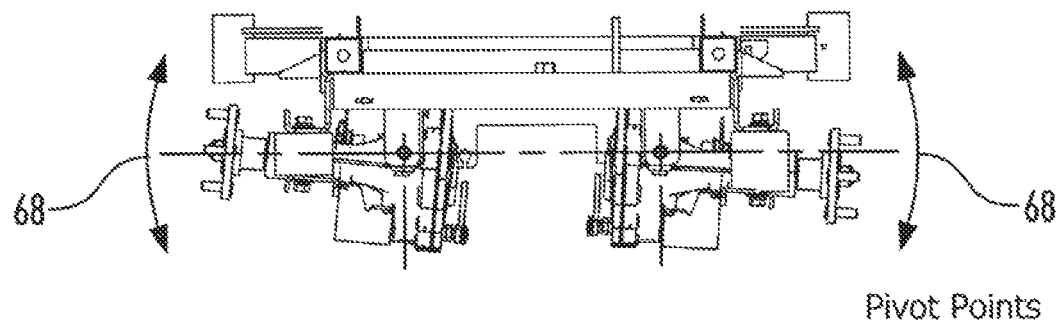
FIG. 8 is an enlarged elevational view taken generally from the rear thereof and similar to FIG. 7 but showing movement; and, FIG. 9 is an enlarged bottom plan view and similar to FIG. 5 but showing movement and axes of rotation.
Figure 9:
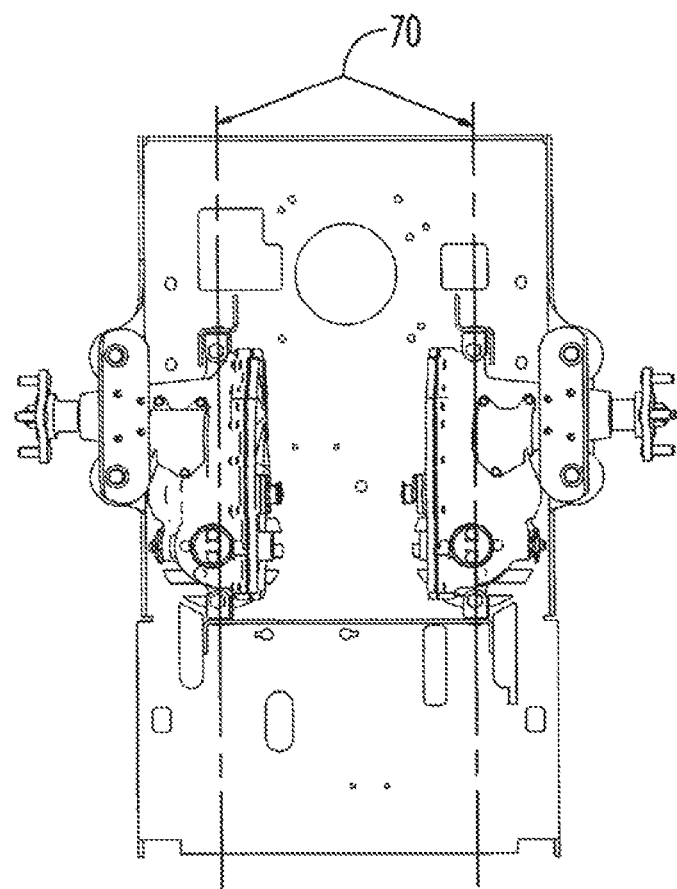

Movement of the wheel assemblies 72 is limited and vibration is dampened by the provision of damping pillows 81 which are secured between the downwardly depending frame flanges 60 on the forward and rear sides of the transaxles 65. The pivotal movement of each transaxle 65 is shown by arrow 68 with the axes of rotation indicated by lines 70, which corresponds to an accompanying compression or extension of the affected pillows 81 (FIGS. 8 and 9).

Each pillow 81 is resilient and may be of any one of several durometers of rubber hardness, or may be of other suitable elastomeric materials, including elastic shells with a liquid or other compressible material there within, appropriate to the weight of the mower and the terrain to be traversed. The pillows define a cushion between the wheel and the frame of the mower, thereby absorbing shock created by the wheel moving over the uneven terrain. Further, each wheel functions independently, i.e., independent of the frame, in order that it may respond independently to variations in the terrain met by each individual wheel, which may be several feet removed from its companion wheel.

The pillows 81 are positioned between such flanges and a bolt 85 passes through the longitudinal axis of each pillow and is secured in apertures in the aligned flanges to thereby hold the pillow between them. The pillow is sized to abut the flanges above and beneath each, where it is held in place by bolts, and the pillow is compressed by the rapid upward movement of a wheel assembly, thereby dampening that movement and inhibiting, or at least modulating, transmission of that movement to the frame of the mower. The rapid movement resulting from the traversing of rocks and other debris is particularly well dampened. Moreover, if the wheel were to move downwardly, in a pot hole for example, it is inhibited from moving too rapidly or too far from its unstressed position.

The apparatus of the invention is capable of receiving additional, optional features which are not a part of the present invention. For example, a purchaser or user may specify an optional railing or grab bars may be included to facilitate handling of the device during deployment. Other optional features, some of which may be illustrated herein, may or may not be included with apparatus incorporating the basic aspects of present invention.

In describing a preferred embodiment of the invention illustrated in the drawings, specific terminology has been used for the sake of clarity. However, the invention is not intended to be limited to the specific terms selected, and it is to be understood that each specific term includes all technical equivalents which operate in a similar manner to accomplish a similar purpose.

What is claimed is:

1. A zero-turn radius (ZTR) riding lawnmower system comprising:
   a frame;
   a right rear drive system comprising:
      a right integrated hydraulic transaxle comprising a right hydraulic pump, a right hydraulic motor and a right drive axle, the right drive axle configured to rotate about a right axle axis, and the right integrated hydraulic trans axle pivotally coupled to the frame such that the right integrated hydraulic transaxle is configured to pivot about a right pivot axis oriented transverse to the right axle axis and parallel to a longitudinal axis of the riding lawnmower system;
      a right rear drive wheel coupled to the right drive axle of the right integrated hydraulic transaxle, the right rear drive wheel configured to rotate about the right axle axis and to pivot about the right pivot axis with the right integrated hydraulic transaxle; and
      a right resilient member, pivoting of the right integrated hydraulic transaxle about the right pivot axis configured to cause compression of the right resilient member,
      the right integrated hydraulic transaxle comprising:
         a distal end comprising an end of the right integrated hydraulic transaxle located farthest from the longitudinal axis of the riding lawnmower system; and
         a proximal end comprising an end of the right integrated hydraulic transaxle located closest to the longitudinal axis of the riding lawnmower system,
      the proximal end of the right integrated hydraulic transaxle located a first distance from the longitudinal axis of the riding lawnmower system, the right pivot axis located a second distance from the longitudinal axis of the riding lawnmower system, and the second distance is greater than the first distance; and
   a left rear drive system comprising:
      a left integrated hydraulic transaxle comprising a left hydraulic pump, a left hydraulic motor and a left drive axle, the left drive axle configured to rotate about a left axle axis, and the left integrated hydraulic transaxle pivotally coupled to the frame such that the left integrated hydraulic transaxle is configured to pivot about a left pivot axis oriented transverse to the left axle axis and parallel to the longitudinal axis of the riding lawnmower system;
      a left rear drive wheel coupled to the left drive axle of the left integrated hydraulic transaxle, the left rear drive wheel configured to rotate about the left axle axis and to pivot about the left pivot axis with the left integrated hydraulic transaxle; and
      a left resilient member, pivoting of the left integrated hydraulic transaxle about the left pivot axis configured to cause compression of the left resilient member,
      the left integrated hydraulic transaxle comprising:
         a distal end comprising an end of the left integrated hydraulic transaxle located farthest from the longitudinal axis of the riding lawnmower system; and
         a proximal end comprising an end of the left integrated hydraulic transaxle located closest to the longitudinal axis of the riding lawnmower system, and
      the proximal end of the left integrated hydraulic transaxle located a third distance from the longitudinal axis of the riding lawnmower system, the left pivot axis located a fourth distance from the longitudinal axis of the riding lawnmower system, and the fourth distance is greater than the third distance.

2. The system of claim 1, wherein the first distance is equal to the third distance, and the second distance is equal to the fourth distance.

3. The system of claim 1, wherein:
   the right pivot axis and the left pivot axis are not coaxial,
   the right pivot axis is laterally offset to a right side of the longitudinal axis of the riding lawnmower system, and
   the left axle axis is laterally offset to a left side of the longitudinal axis of the riding lawnmower system.

4. The system of claim 1, wherein:
   the right rear wheel is located a fifth distance from the longitudinal axis of the riding lawnmower system, and the second distance is less than the fifth distance, and
   the left rear wheel is located a sixth distance from the longitudinal axis of the riding lawnmower system, and the fourth distance is less than the sixth distance.

5. The system of claim 1, wherein:
   the distal end of the right integrated hydraulic transaxle is located a fifth distance from the longitudinal axis of the riding lawnmower system, and the second distance is less than the fifth distance, and the distal end of the left integrated hydraulic transaxle is located a sixth distance from the longitudinal axis of the riding lawnmower system, and the fourth distance is less than the sixth distance.

6. The system of claim 1, wherein:

the right resilient member is located a fifth distance from the longitudinal axis of the riding lawnmower system, and the fifth distance is greater than the second distance, and the left resilient member is located a sixth distance from the longitudinal axis of the riding lawnmower system, and the sixth distance is greater than the fourth distance.

7. The system of claim 1, wherein:

the right integrated hydraulic transaxle comprises a right pulley location that is laterally offset from the longitudinal axis of the riding lawnmower system and is vertically aligned with the right pivot axis, and the left integrated hydraulic transaxle comprises a left pulley location that is laterally offset from the longitudinal axis of the riding lawnmower system and is vertically aligned with the left pivot axis.

8. The system of claim 1, wherein:

the distal end of the right integrated hydraulic transaxle comprises an end of the right drive axle extending from the right integrated hydraulic transaxle, and the distal end of the left integrated hydraulic transaxle comprises an end of the left drive axle extending from the left integrated hydraulic transaxle.

9. The system of claim 1, wherein:

pivoting of the right integrated hydraulic transaxle about the right pivot axis comprises the right hydraulic pump, the right hydraulic motor and the right drive axle pivoting together as a unit about the right pivot axis, pivoting of the left integrated hydraulic transaxle about the left pivot axis comprises the left hydraulic pump, the left hydraulic motor and the left drive axle pivoting together as a unit about the left pivot axis, the right integrated hydraulic transaxle is configured to pivot about the right pivot axis independent of pivoting of the left integrated hydraulic transaxle about the left pivot axis, and the left integrated hydraulic transaxle is configured to pivot about the left pivot axis independent of pivoting of the right integrated hydraulic transaxle about the right pivot axis.

10. The system of claim 1, wherein:

the right integrated hydraulic transaxle is pivotally coupled to the frame by way of a right pivot rod that defines the right pivot axis, and the left integrated hydraulic transaxle pivotally coupled to the frame by way of a left pivot rod that defines the left pivot axis.

11. The system of claim 10, wherein:

the right pivot rod is coupled to a right member extending from a body of the frame, and the left pivot rod is coupled to a left member extending from the body of the frame.

12. The system of claim 10, further comprising:

a right intermediate member, wherein the right integrated hydraulic transaxle is coupled to the right pivot rod by way of the right intermediate member; and a left intermediate member, wherein the left integrated hydraulic transaxle is coupled to the left pivot rod by way of the left intermediate member.

13. The system of claim 1, further comprising:

a right pivot assembly, wherein the right integrated hydraulic transaxle is pivotally coupled to the frame by way of the right pivot assembly, the right pivot assembly comprising:

a first right pivot element coupled to a first side of the right integrated hydraulic transaxle; and a second right pivot element coupled to a second side of the right integrated hydraulic transaxle and oriented coaxial with the first right pivot element; and a left pivot assembly, wherein the left integrated hydraulic transaxle is pivotally coupled to the frame by way of the left pivot assembly, the left pivot assembly comprising:

a first left pivot element coupled to a first side of the left integrated hydraulic transaxle; and a second left pivot element coupled to a second side of the left integrated hydraulic transaxle and oriented coaxial with the first left pivot element.

14. The system of claim 1, wherein:

pivoting of the right integrated hydraulic transaxle in a first direction about the right pivot axis is configured to cause compression of the right resilient member, pivoting of the left integrated hydraulic transaxle in a second direction about the left pivot axis is configured to cause compression of the left resilient member, and the second direction is opposite the first direction.

15. A zero-turn radius (ZTR) riding lawnmower system comprising:

a frame;

a right rear drive system comprising:

a right integrated hydraulic drive unit comprising a right hydraulic pump, a right hydraulic motor and a right drive axle, the right drive axle configured to rotate about a right axle axis, and the right integrated hydraulic drive unit pivotally coupled to the frame such that the right integrated hydraulic drive unit is configured to pivot about a right pivot axis oriented transverse to the right axle axis and parallel to a longitudinal axis of the riding lawnmower system;

the right drive axle configured to couple to a right rear drive wheel, the right rear drive wheel configured to rotate about the right axle axis and to pivot about the right pivot axis with the right integrated hydraulic drive unit; and a right resilient member, pivoting of the right integrated hydraulic drive unit about the right pivot axis configured to cause deformation of the right resilient member, the right integrated hydraulic drive unit comprising:

a distal end comprising an end of the right integrated hydraulic drive unit located farthest from the longitudinal axis of the riding lawnmower system; and a proximal end comprising an end of the right integrated hydraulic drive unit located closest to the longitudinal axis of the riding lawnmower system, the proximal end of the right integrated hydraulic drive unit located a first distance from the longitudinal axis of the riding lawnmower system, the right pivot axis located a second distance from the longitudinal axis of the riding lawnmower system, and the second distance being greater than the first distance; and a left rear drive system comprising:

a left integrated hydraulic drive unit comprising a left hydraulic pump, a left hydraulic motor and a left drive axle, the left drive axle configured to rotate about a left axle axis, and the left integrated hydraulic drive unit pivotally coupled to the frame such that the left integrated hydraulic drive unit is configured to pivot about a left pivot axis oriented transverse to the left axle axis and parallel to the longitudinal axis of the riding lawnmower system;

the left drive axle configured to couple to a left rear drive wheel, the left rear drive wheel configured to rotate about the left axle axis and to pivot about the left pivot axis with the left integrated hydraulic drive unit; and a left resilient member, pivoting of the left integrated hydraulic drive unit about the left pivot axis configured to cause deformation of the left resilient member, the left integrated hydraulic drive unit comprising:
- a distal end comprising an end of the left integrated hydraulic drive unit located farthest from the longitudinal axis of the riding lawnmower system; and
- a proximal end comprising an end of the left integrated hydraulic drive unit located closest to the longitudinal axis of the riding lawnmower system, and
- the proximal end of the left integrated hydraulic drive unit located a third distance from the longitudinal axis of the riding lawnmower system, the left pivot axis located a fourth distance from the longitudinal axis of the riding lawnmower system, and the fourth distance being greater than the third distance.

16. The system of claim 15, wherein the first distance is equal to the third distance, and the second distance is equal to the fourth distance.

17. The system of claim 15, wherein:
the right pivot axis and the left pivot axis are not coaxial,
the right pivot axis is laterally offset to a right side of the longitudinal axis of the riding lawnmower system, and
the left axle axis is laterally offset to a left side of the longitudinal axis of the riding lawnmower system.

18. The system of claim 15, wherein:
the right rear wheel is located a fifth distance from the longitudinal axis of the riding lawnmower system, and the second distance is less than the fifth distance, and
the left rear wheel is located a sixth distance from the longitudinal axis of the riding lawnmower system, and the fourth distance is less than the sixth distance.

19. The system of claim 15, wherein:
the distal end of the right integrated hydraulic drive unit is located a fifth distance from the longitudinal axis of the riding lawnmower system, and the second distance is less than the fifth distance, and
the distal end of the left integrated hydraulic drive unit is located a sixth distance from the longitudinal axis of the riding lawnmower system, and the fourth distance is less than the sixth distance.

20. The system of claim 15, wherein:
the right resilient member is located a fifth distance from the longitudinal axis of the riding lawnmower system, and the fifth distance is greater than the second distance, and
the left resilient member is located a sixth distance from the longitudinal axis of the riding lawnmower system, and the sixth distance is greater than the fourth distance.

21. The system of claim 15, wherein:
the right integrated hydraulic drive unit comprises a right pulley location that is laterally offset from the longitudinal axis of the riding lawnmower system and is vertically aligned with the right pivot axis, and
the left integrated hydraulic drive unit comprises a left pulley location that is laterally offset from the longitudinal axis of the riding lawnmower system and is vertically aligned with the left pivot axis.

22. The system of claim 15, wherein:
the distal end of the right integrated hydraulic drive unit comprises an end of the right drive axle extending from the right integrated hydraulic drive unit, and
the distal end of the left integrated hydraulic drive unit comprises an end of the left drive axle extending from the left integrated hydraulic drive unit.

23. The system of claim 15, wherein:
pivoting of the right integrated hydraulic drive unit about the right pivot axis comprises the right hydraulic pump, the right hydraulic motor and the right drive axle pivoting together as a unit about the right pivot axis,
pivoting of the left integrated hydraulic drive unit about the left pivot axis comprises the left hydraulic pump, the left hydraulic motor and the left drive axle pivoting together as a unit about the left pivot axis,
the right integrated hydraulic drive unit is configured to pivot about the right pivot axis independent of pivoting of the left integrated hydraulic drive unit about the left pivot axis, and
the left integrated hydraulic drive unit is configured to pivot about the left pivot axis independent of pivoting of the right integrated hydraulic drive unit about the right pivot axis.

24. The system of claim 15, wherein:
the right integrated hydraulic drive unit is pivotally coupled to the frame by way of a right pivot rod that defines the right pivot axis, and
the left integrated hydraulic drive unit pivotally coupled to the frame by way of a left pivot rod that defines the left pivot axis.

25. The system of claim 24, wherein:
the right pivot rod is coupled to a right member extending from a body of the frame, and
the left pivot rod is coupled to a left member extending from the body of the frame.

26. The system of claim 24, further comprising:
a right intermediate member, wherein the right integrated hydraulic drive unit is coupled to the right pivot rod by way of the right intermediate member; and
a left intermediate member, wherein the left integrated hydraulic drive unit is coupled to the left pivot rod by way of the left intermediate member.

27. The system of claim 15, further comprising:
a right pivot assembly, wherein the right integrated hydraulic drive unit is pivotally coupled to the frame by way of the right pivot assembly, the right pivot assembly comprising:
- a first right pivot element coupled to a first side of the right integrated hydraulic drive unit; and
- a second right pivot element coupled to a second side of the right integrated hydraulic drive unit and oriented coaxial with the first right pivot element; and
a left pivot assembly, wherein the left integrated hydraulic drive unit is pivotally coupled to the frame by way of the left pivot assembly, the left pivot assembly comprising:
- a first left pivot element coupled to a first side of the left integrated hydraulic drive unit; and a second left pivot element coupled to a second side of the left integrated hydraulic drive unit and oriented coaxial with the first left pivot element.

28. The system of claim 15, wherein:
the deformation of the right resilient member comprises compression or extension of the right resilient member, and
the deformation of the left resilient member comprises compression or extension of the left resilient member.

29. The system of claim 15, wherein:
pivoting of the right integrated hydraulic drive unit in a first direction about the right pivot axis is configured to cause compression of the right resilient member,
pivoting of the left integrated hydraulic drive unit in a second direction about the left pivot axis is configured to cause compression of the left resilient member, and
the second direction is opposite the first direction.

30. The system of claim 15, wherein:
the right integrated hydraulic drive unit comprises an integrated hydraulic transaxle, and
the left integrated hydraulic drive unit comprises an integrated hydraulic transaxle.

* * * * *